United States Patent [19]

Conner et al.

[11] 4,224,684
[45] Sep. 23, 1980

[54] RECEIVE/BYPASS CIRCUIT FOR SUBSYSTEMS IN POLLING SYSTEM

[75] Inventors: David E. Conner, Cary; Charles R. Hoffman, Raleigh; Melvin T. Laakso, Cary, all of N.C.

[73] Assignee: International Business Machines Corporation, Armonk, N.Y.

[21] Appl. No.: 944,960

[22] Filed: Sep. 22, 1978

[51] Int. Cl.² .................. H03K 17/60; H04Q 1/20
[52] U.S. Cl. ............................................. 364/900
[58] Field of Search ... 364/200 MS File, 900 MS File; 307/205, 217, 239, 251

[56] References Cited

U.S. PATENT DOCUMENTS

| 3,534,337 | 10/1970 | Martin et al. | 364/900 |
| 4,035,770 | 7/1977 | Sarle | 364/900 |
| 4,042,836 | 8/1977 | Compton | 307/251 |
| 4,158,149 | 6/1979 | Otofuji | 307/251 |

*Primary Examiner*—Mark E. Nusbaum
*Assistant Examiner*—David. Y. Eng
*Attorney, Agent, or Firm*—Gerald R. Woods

[57] ABSTRACT

A polling system includes a central processor and a plurality of subsystems connected in a loop to the central processor. A receive/bypass circuit in each subsystem includes a depletion mode field effect transistor having its drain and source electrodes connected in series in a bypass line at the subsystem. A control circuit is connected to a polling signal input line at each subsystem. When the subsystem has power, the control circuit routes the polling signal to a terminal device in the subsystem while establishing a conduction-inhibiting voltage at the gate electrode of the field effect transistor. When the subsystem is unpowered or out of service, a switching transistor in the control circuit isolates the terminal device from the polling signal input line. The polling signal bypasses an unpowered subsystem through the unbiased field effect transistor in the bypass line.

7 Claims, 4 Drawing Figures

RECEIVE/BYPASS CIRCUIT FOR SUBSYSTEMS IN POLLING SYSTEM

TECHNICAL FIELD

The present invention relates to switching circuits and more particularly to a receive/bypass circuit for use in polling systems.

A polling data processing system can be generally defined as a system which includes a central processor and a plurality of peripheral units or subsystems, any one of which may be linked directly to the central processor through a data bus at a given time. Generally speaking, the central processor generates a polling signal which is transmitted to the subsystems to indicate that the central processor is ready to communicate with any subsystem requiring service.

In a receive-retransmit system, the polling signal is transmitted from one subsystem to the next in sequence through a terminal device in the subsystem. If a particular device does not require service at the time the polling signal is received, that device retransmits the polling signal to the next subsystem in the loop.

The polling signal is captured by the first subsystem requiring service and is not "seen" by subsystems further along in the loop.

Not every terminal device in a loop will always be in service. In normal data processing operations, one or more terminal devices may be out of service at a given time due to lack of demand, preventative maintenance, or equipment failure.

When power is removed from an out of service terminal device, that device becomes incapable of retransmitting a polling signal.

To avoid having the polling signal prematurely blocked at the first out-of-service terminal device in a loop, each subsystem includes a bypass circuit which can be used to route a polling signal past an out-of-service device and directly to the next subsystem in the loop.

PRIOR ART

The prior art bypass circuits basically include an electromechanical relay connected in parallel with each terminal device in the loop. While power is applied to the terminal device, the relay is held open to cause the polling signal to be routed to the terminal device at the input side to the relay. If the terminal device does not need service from the central processor, the terminal device retransmits the polling signal to a polling signal line at the output side of the bypass relay. The retransmitted polling signal is carried to the next subsystem in the loop.

If power is removed from a particular terminal device for any reason, the bypass relay is allowed to close while another electromechanical relay at the input to the terminal device is allowed to open to isolate the terminal device from incoming polling signals. Any polling signal generated after the relays change condition bypasses the isolated terminal device through the closed bypass relay.

While electromechanical relays have an advantage in that they provide a bypass with minimal impedance and, therefore, minimal signal degradation, such relays also have significant drawbacks. Electromechanical relays not only cost more initially than solid state components, they also require more space and consume more power than purely electronic switching devices. Moreover, electromechanical relays do not generally have the same level of reliability as solid state devices. In addition, electromechanical relays must be tested by the use of special test procedures not otherwise applicable to devices employing solid state technology.

SUMMARY

The present invention is a solid state receive/bypass circuit for use in a polling system including a central processor, a polling signal line and a plurality of subsystems, any one of which may respond to an input polling signal by establishing a communications link with the central processor.

The receive/bypass circuit, which is included in each of the subsystems, is capable of routing a polling signal to a powered terminal device in the subsystem, or past an unpowered or out-of-service device. Each receive/bypass circuit includes a depletion mode field effect transistor having a drain electrode connected to a polling signal input line, a source electrode connected to a polling signal output line, and a gate electrode. A control circuit is connected to the polling signal input line, to the gate electrode of the field effect transistor and to the terminal device. The control system responds to the existence of power at the subsystem to establish a conduction-inhibiting voltage at the gate electrode of the field effect transistor while routing input polling signals to the terminal device. If a particular terminal device wishes to establish a communication link with the central unit, the polling signal is captured. If, however, the terminal device does not wish to establish a link to the central unit, the terminal device retransmits the polling signal to the polling signal line leading to the next subsystem in the loop. The field effect transistor is conductive in the absence of power at a subsystem and permits the polling signal to pass directly from the input line to the output line rather than being routed through the terminal device. The electrical resistance presented by the field effect transistor in the absence of power is on the order of one ohm or less so that minimal degradation of the polling signal occurs.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

DETAILED DESCRIPTION

Figure 1:
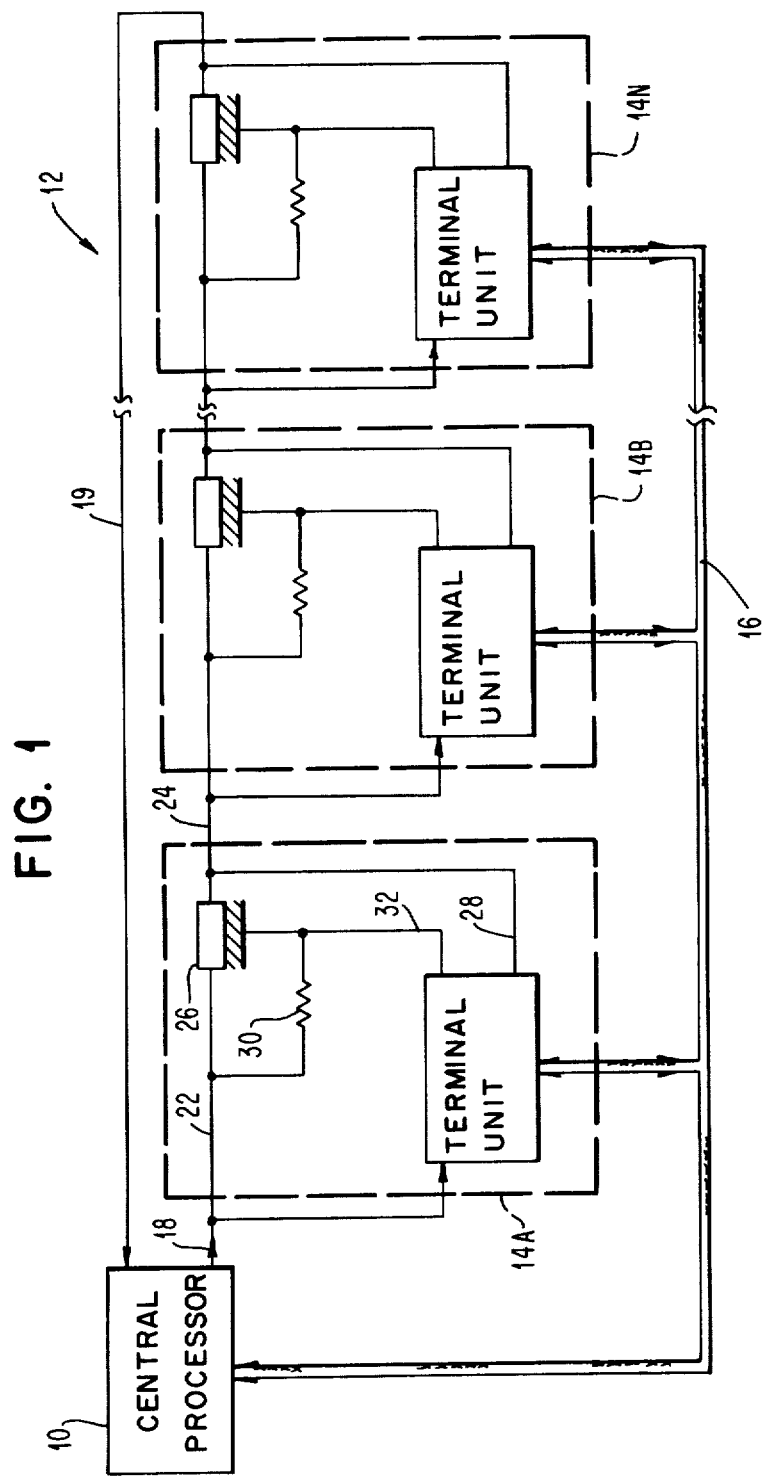
FIG. 1 is a partially schematic block diagram of a system incorporating the present invention.

Referring to FIG. 1, a system into which the present invention may be incorporated includes a central processor 10 and a loop 12 of subsystems 14A, 14B, . . . 14N, any one of which may be linked to the central processor 10 at a given time through a data bus 16. The subsystems are also linked to the central processor 10 through a polling signal line 18.

In an actual data processing system, the individual subsystems include terminal devices which may have different capabilities and functions. That is, the term "terminal device" is used generically and is not to be limited to a particular type of device. For example, a terminal device may be a display terminal, a printer, an input/output control unit or even another central processor. The actual differences are ignored in describing the present invention since the characteristics of a terminal device are immaterial in the practice of the present invention. The only requirements common to all terminal devices in the loop are that each device must be capable of retransmitting a polling signal when it does not require service and of communicating with the central processor when it does require service.

The input/output connections for subsystem 14A are described in detail below. It should be understood that all other subsystems in the loop have identical input/output connections. At the subsystem, the polling signal line can be considered as consisting of an input line 20, a bypass line 22 and an output line 24. The bypass line 22 includes a depletion mode field effect transistor 26 having drain and source electrodes defining a selectively-conductive link through which the input line 20 can be tied directly to the output line 24. A bias resistor 30 is connected between the drain and gate electrodes of field effect transistor 26. The voltage on the gate electrode is a function of an output 32 from the subsystem 14A. Another output 28 from the subsystem 14A is connected directly to the output line 24.

Each subsystem in the loop includes conventional circuitry for generating a POR (Power On Reset) signal. The POR signal is used to initialize registers and counters in the subsystem terminal device when power is restored to the device. The output side of the last subsystem in the loop is connected directly to the central processor 10 through a return line 19 to complete the loop. The polling signal is returned to central processor 10 through line 19 when none of the subsystems requires service. Unpowered subsystems are bypassed as a result of the operation of the receive/bypass circuit to be described in more detail with reference to FIG. 2.

Figure 2:
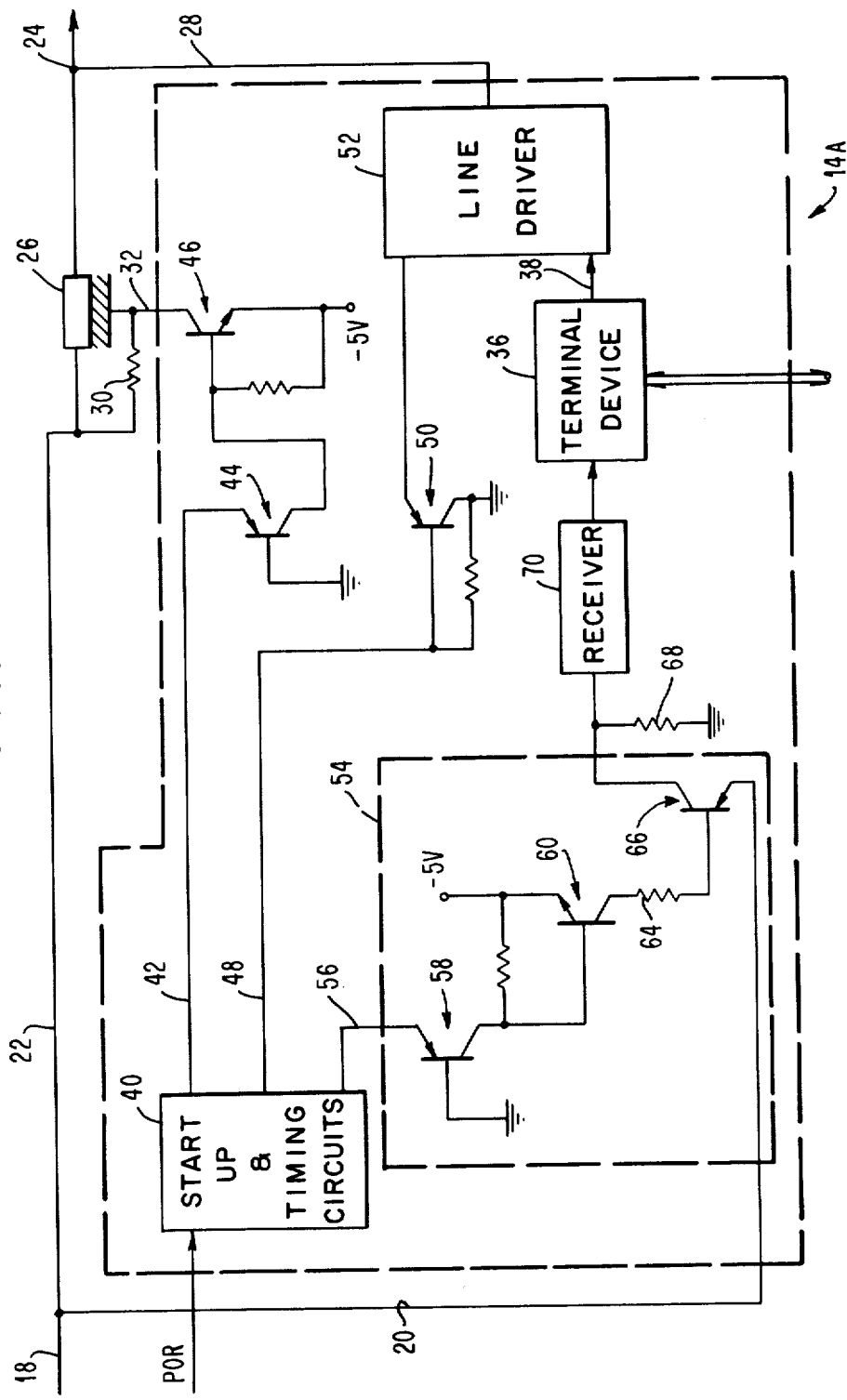
FIG. 2 is a more detailed partially schematic diagram of a subsystem including a receive/bypass circuit constructed in accordance with the present invention.

Referring to FIG. 2, each receive/bypass circuit is used in combination with a terminal device 36 which by itself may be conventional in nature. Device 36 must be capable of retransmitting a polling signal on an output line 38 if the device does not require service from the central processor.

The receive/bypass circuit includes a start up and timing circuit 40 with the power on reset (POR) signal as an input. The circuit 40 has a first output line 42 connected to the emitter electrode of a transistor 44 having a grounded base electrode. The collector electrode of transistor 44 is connected directly to the base electrode of a second transistor 46. The collector electrode of transistor 46 is connected to the gate electrode of the depletion mode field effect transistor 26 while the emitter electrode of transistor 46 is connected to a negative voltage bus. The transistors 44 and 46 form a voltage translating circuit for translating the voltage levels provided by circuit 40 to switching levels suitable for the field effect transistor 26.

A second output line 48 from circuit 40 is connected to the base electrode of a transistor 50 which, when conductive, clamps or grounds a conventional line driver circuit 52. Line driver circuit 52 is normally used to amplify a polling signal retransmitted by device 36. To prevent spurious transmissions, line driver 52 is grounded through transistor 50 whenever power is removed from the subsystem.

A third output line 56 from circuit 40 provides a control signal for a low impedance switch 54 in the input line 20. The output line 56 is connected to the emitter electrode of a transistor 58 having a grounded base electrode and a collector electrode connected to the base electrode of another transistor 60. The emitter electrode of transistor 60 is connected directly to a negative voltage bus. The collector electrode of transistor 60 is connected through a resistor 64 to the base electrode of a switching transistor 66, the emitter and collector electrodes of which are in series in the input line 20. The collector electrode of transistor 66 is connected both to the upper end of a terminating impedance 68 and to a signal-conditioning receiver circuit 70 at the input to terminal device 36.

The circuit described above operates as follows to cause a polling signal to be routed to terminal device 36 when the subsystem has power or to be routed past the subsystem when it is unpowered.

When the subsystem power is on, the signal carried by output line 42 from circuit 40 is high, causing transistor 44 to be conductive. In turn, transistor 46 conducts to establish a negative bias at the gate electrode of depletion mode field effect transistor 26. The negative gate electrode bias depletes the drain to source channel of carriers causing field effect transistor 26 to act as an open circuit in the bypass line 22.

When the signal on output line 42 is high, the signal on output line 48 from circuit 40 is also high to provide a blocking voltage on the gate of transistor 50. Transistor 50 is non-conductive and isolates line driver 52 from ground.

The signal on output line 56 is also high when power is applied to the subsystem, causing transistors 58 and 60 to be conductive. The conductive path through the transistor 60 provides negative bias voltage to the base electrode of transistor 66 to cause transistor 66 to conduct. Transistor 66 provides a low impedance path for polling signals applied to the terminal device 36 through the input line 20.

To summarize, when the subsystem has power, the bypass line 22 is open circuited by the non-conducting field effect transistor 26, the line driver circuit 52 is enabled since non-conducting transistor 50 isolates the ground clamp and the polling signal is routed to the terminal device 36 through the conductive switching transistor 66.

When power is removed from the subsystem, the signal on output line 42 goes low, terminating conduction through transistor 44. Consequently, transistor 46 becomes non-conducting, providing an open circuit between the gate electrode of field effect transistor 26 and the negative voltage bus. The field effect transistor 26 remains conductive notwithstanding the lack of a bias voltage at the gate electrode. Even in the absence of gate bias voltage, the impedance of the field effect transistor is quite low, being on the order of one ohm or less. Consequently, there is minimal degradation of the polling signal as it is routed past the unpowered subsystem on the bypass line 22.

In the absence of power, the signal on output line 48 is also low, allowing transistor 50 to conduct. When transistor 50 conducts, the line driver circuit 52 is clamped directly to ground and is effectively disabled.

The signal on line 56 is also low in the absence of power, causing transistors 58, 60 and 66 to assume non-conducting states. Transistor 66 effectively acts as an open circuit in the polling signal input line 20 to prevent a polling signal from reaching receiver 70 or terminal device 36.

For the receive/bypass circuit to operate properly, the transistors 26, 50 and 66 must not only assume the states described during powered and unpowered subsystem operation, they must achieve those states in a predetermined sequence when power is being restored to the subsystem. More specifically, when power is being restored, the signal on output line 48 rises first to remove the ground clamp at the line driver 52. Then, the signal on output line 56 rises to drive transistor 66 into its conductive state to provide a low impedance path to the terminal device 36 from the polling signal input line 20. Finally, the signal on output line 42 is raised to produce a negative bias voltage at the gate electrode of the field effect transistor 26, which results in an open circuit in bypass line 22.

When the subsystem is taken out of service by removing power, an inverted sequence is employed. That is, the signal on output line 42 goes low first to remove the negative bias voltage at the gate electrode of the field effect transistor 26. Transistor 26 will begin to conduct and remain conductive in the absence of subsystem power. The output on line 56 goes low next to switch transistor 66 to its non-conductive state, effectively isolating the receiver 70 from the polling signal input line 20. Finally, the output on line 48 is allowed to go low to clamp the line driver 52 to ground through the now conductive transistor 50.

Figure 3:
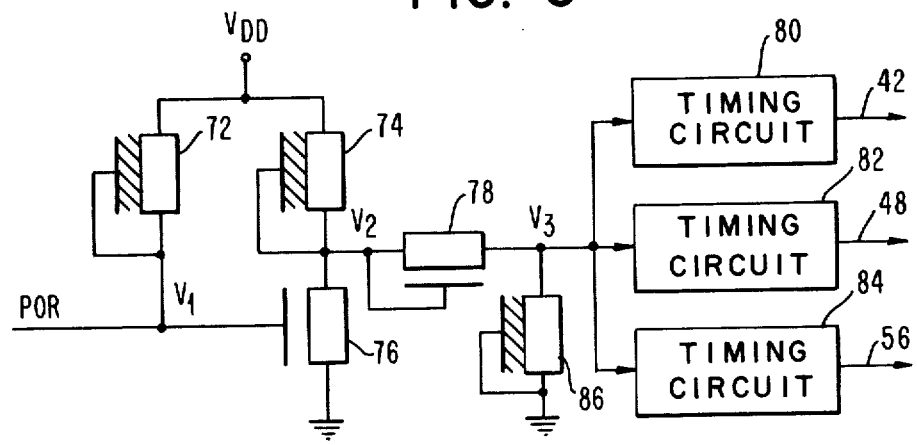
FIG. 3 is a more detailed diagram of an anti-glitch circuit used in the start up and timing circuit of the receive/bypass circuit.

To prevent improper sequencing which might be caused by random pulses during the restoration of power to the subsystem, an anti-glitch circuit of the type illustrated in FIG. 3 is used. The anti-glitch circuit includes first and second depletion mode field effect transistors 72 and 74, each having a common gate electrode/source electrode connection and a drain electrode connected to $V_{DD}$, the subsystem power source. The source electrode of field effect transistor 72 is connected to the POR input and to the gate electrode of an enhancement mode field effect transistor 76. The source electrode of the field effect transistor 76 is connected to ground while the drain electrode is connected to the source electrode of the field effect transistor 74. This common connection between transistors 74 and 76 is, in turn, connected to the drain electrode of another enhancement mode field effect transistor 78 having a common drain/gate connection. The source electrode of field effect transistor 78 is connected to inputs to timing circuits 80, 82 and 84, the respective outputs of which are output lines 42, 48 and 56. Small depletion mode field effect transistor 86 has its drain electrode connected to the source electrode of transistor 78 and its gate and source electrodes connected to ground.

Figure 4:
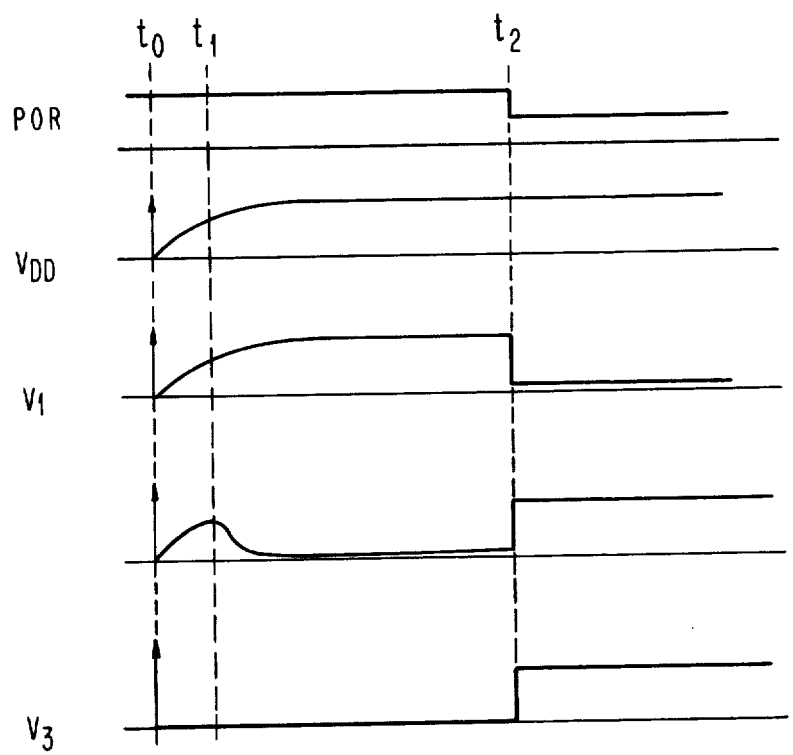
FIG. 4 is chart of voltages generated at a specified points in the anti-glitch circuit shown in FIG. 3.

The operation of the anti-glitch circuit described above is illustrated with reference to FIG. 4, which shows the voltages at various points in the circuit during restoration of subsystem power and consequent generation of a reset (POR) signal. Initially, the POR signal has a predetermined positive level above ground. At an arbitrary time $t_0$, the subsystem power $V_{DD}$ is restored and begins to rise from zero toward its steady state level. The voltage $V_1$ at the source electrode of field effect transistor 72 and at the gate electrode of field effect transistor 76 follows $V_{DD}$ initially. The voltage $V_2$ also begins to follow $V_{DD}$. However, when the voltage $V_1$ exceeds the threshold voltage for the enhanced mode field effect transistor 76, that transistor begins to conduct (at a time $t_1$), causing the voltage $V_2$ to fall toward ground.

When the POR signal goes negative at an arbitrary time $t_2$, field effect transistor 76 is turned off, causing the voltage $V_2$ to step to a more positive level. Voltage $V_3$ is initially held at or near ground level by the use of the relatively small depletion mode field effect transistor 86. This is because transistor 86 provides a direct path to ground at least at low levels of $V_3$. However, because of its small size, transistor 86 saturates quickly when transistor 78 becomes conductive. Once saturated, transistor 86 does not appreciably affect the build up of voltage $V_3$.

Thus, it can be seen that the anti-glitch circuit provides a step function output voltage which is not effected by the fact that temporary surges in the subsystem voltage may cause the field effect transistors to temporarily conduct. The voltage $V_3$ is used as a trigger for each of the three timing circuits. Each of the timing circuits, which may be conventional in nature, will generate an output signal which will go high at a different predetermined period of time after $V_3$ goes high and will go low at a different predetermined period of time after power is removed from the subsystem.

While there has been described what is considered to be a preferred embodiment of the present invention, variations and modifications therein will occur to those skilled in the art once they become acquainted with the basic concepts of the invention. Therefore, it is intended that the appended claims shall be construed to include the preferred embodiment and all variations and modifications as fall within the true spirit and scope of the invention.

Having thus described my invention, what I claim as new, and desire to secure by Letters Patent is:

1. For use in a polled system including a central processor having a polling signal line and a plurality of subsystems, each having a terminal device which may respond to a received polling signal by establishing a communications link with the central processor, a receive/bypass circuit connected to each of the terminal devices and capable of causing a polling signal to be routed to a powered terminal device or past an unpowered terminal device, each said receive/bypass circuit comprising:

a first depletion mode field effect transistor having a drain electrode connected to a polling signal input line, a source electrode connected to a polling signal output line, and a gate electrode; and a control circuit connected to the polling signal input line, to the gate electrode of said first depletion mode field effect transistor and to the terminal device, said control circuit being responsive to the presence of subsystem power to establish a conduction-inhibiting voltage on the gate electrode of said first depletion mode field effect transistor while routing an input polling signal to the powered terminal device for retransmission by the terminal device to the polling signal output line if no communications link is to be established, said first depletion mode field effect transistor being conductive in the absence of power at the subsystem to permit the polling signal to pass directly from the input line to the output line.

2. A receive/bypass circuit as defined in claim 1, wherein said control circuit further includes:
- a terminating impedance having a first terminal connected to ground and a second terminal connected to the polling signal line at the input to the circuit;
- switching means connected in series in the polling signal line between said second terminal and the polling signal input to said control circuit; and
- timing means for sequentially applying a conduction-enabling signal to said switching means and a conduction-inhibiting signal to said first depletion mode field effect transistor when power is restored to the terminal device and for establishing a conduction-permitting state at said first depletion mode field effect transistor and for applying a conduction-inhibiting signal to said switching means when power is removed from the terminal device.

3. A receive/bypass circuit as defined in claim 2 further including a line driver having an output connected to the polling signal output line and means for disabling the line driver and wherein said timing means includes an output to said disabling means for applying a disabling signal thereto when power is removed from the terminal device.

4. A receive/bypass circuit as defined in claim 3 wherein said timing means comprises:
- a plurality of timing circuits, each capable of producing a predetermined signal at a given time following the application of a control signal thereto; and
- an anti-glitch circuit connected to the inputs to said timing circuits for inhibiting the generation of said control signal until an input reset signal is applied thereto.

5. A receive/bypass circuit as defined in claim 4 wherein said anti-glitch circuit further comprises:
- a second depletion mode field effect transistor having a drain electrode connected to the subsystem power supply and source and gate electrodes for receiving the input reset signal;
- a third depletion mode field effect transistor having a drain electrode connected to the subsystem power supply and source and gate electrodes connected to a common junction;
- a first enhancement mode field effect transistor having a drain electrode connected to said common junction, a source electrode connected to ground and a gate electrode for receiving the input reset signal;
- a second enhancement mode field effect transistor having drain and gate electrodes connected to said common junction and a source electrode for carrying the output control signal; and
- a fourth depletion mode field effect transistor having a drain electrode connected to the source electrode of said second enhancement mode field effect transistor and source and gate electrodes connected to ground.

6. A receive/bypass circuit as defined in claim 5 wherein said control circuit further includes:
- a first transistor having a grounded base terminal, an emitter terminal connected to an output from said timing means, and a collector terminal; and
- a second transistor having a base terminal connected to the collector terminal of said first transistor, an emitter terminal connected to a source of negative voltage and a collector terminal connected to the gate terminal of said first depletion mode field effect transistor.

7. A receive/bypass circuit as defined in claims 2 or 4 wherein said switching means comprises a third transistor having its emitter and collector terminals connected in series in the polling signal input line and its base terminal connected to an output from said timing means.

* * * * *